UNITED STATES PATENT OFFICE.

SIGMUND VON KAPFF, OF BOXGRABEN-AACHEN, GERMANY.

PROCESS OF PRODUCING DIFORMIN.

No. 901,298.  Specification of Letters Patent.  Patented Oct. 13, 1908.

Application filed December 23, 1907. Serial No. 407,333.

*To all whom it may concern:*

Be it known that I, SIGMUND VON KAPFF, a subject of the King of Würtemberg, residing at 100, Boxgraben-Aachen, Germany, have invented certain new and useful Improvements in Methods of Producing Diformin; and I do hereby declare the following to be a full, clear, and exact description of the invention.

The present invention relates to a method of producing diformin.

The methods used hitherto of producing formic acid glycerin esters from glycerin and oxalic acid etc. do not directly result in pure formin, but only mixtures of different formins with glycerin, i. e. products which are not perfectly soluble in ether, whereas pure formins dissolve colorlessly in ether. In the case of the known troublesome and, according to the statement of Beilstein, difficult method diformin could therefore only be obtained pure by digesting the reaction mass with ether. The cause of the incomplete formation of formin lies in the absence of a suitable condensing agent. All condensing agents known hitherto convert glycerin into acrolein. Now it has been found that anhydrous or concentrated formic acid as condensing agent yields no acrolein when formin is formed, but takes up the water of condensation, so that the formic acid which is left over for the reaction converts the glycerin at once and completely into formin, i. e. forms diformin when the necessary quantity is employed. This condensation takes place exceedingly rapidly; simultaneously it is possible to distil off the water, which is liberated during the condensation, as well as the formic acid which is used as condensing agent, so that only pure formin remains behind as the product of the reaction in the distilling apparatus. This employment of formic acid is new and forms the essential element of the patent claim.

Example: 1 kg. 100% formic acid is mixed with 0,4 kg. concentrated (say 95%) glycerin and heated. At 100° C. and over dilute formic acid at once commences to be distilled away. The distillation is continued until the temperature has risen to about 140° C., when diformin remains behind.

The reaction of the process will be understood from the following equation:—

$$\underset{\text{glycerin}}{(C_2H_5(OH)_3)} + \underset{\text{formic acid}}{2HCOOH} =$$
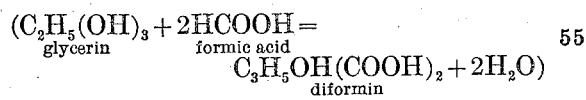

While the concentration of the glycerin employed is stated to be 95%, it is to be understood that the process may be successfully carried out with glycerin of greater or less strength than this.

Other formins than formic acid glycerin ester, for example ethylene-diformin and erythrite-tetra-formiate, are also obtained by boiling with concentrated formic acid, but in this case long continued boiling with very considerable excess of formic acid is necessary in order to gain the desired end. Thus this is not an analogous process, all the less as glycerin also otherwise behaves essentially differently from glycol and erythrite.

What I claim as my invention and desire to secure by Letters Patent is:

1. A method of producing diformin consisting in subjecting glycerin to the direct action of formic acid in the presence of a large excess of formic acid, to act as a condensing agent and in distilling away formic acid and water.

2. In the process of producing diformin, the subjection of glycerin to the direct action of formic acid in the presence of a large excess of formic acid to act as a condensing agent, substantially as described.

In testimony whereof I have signed my name to this specification, in the presence of two subscribing witnesses.

SIGMUND VON KAPFF.

Witnesses:
HENRY QUADFLIEG,
ELISE KALBUSCH.